A. K. BALL.
VEHICLE BODY.
APPLICATION FILED JULY 24, 1909.
994,051.
Patented May 30, 1911.
2 SHEETS—SHEET 1.
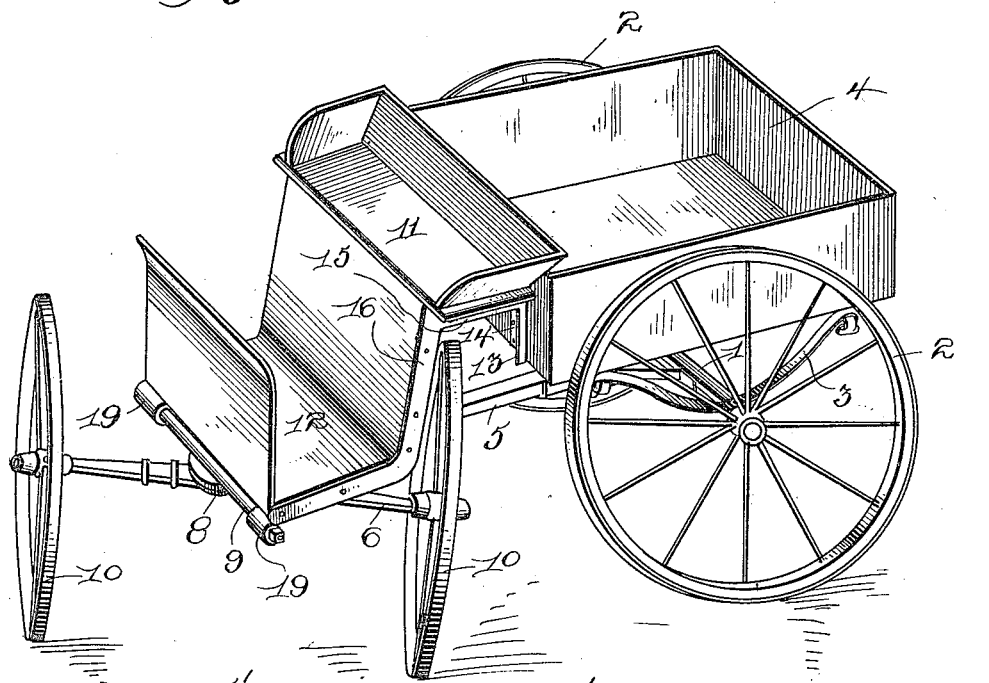
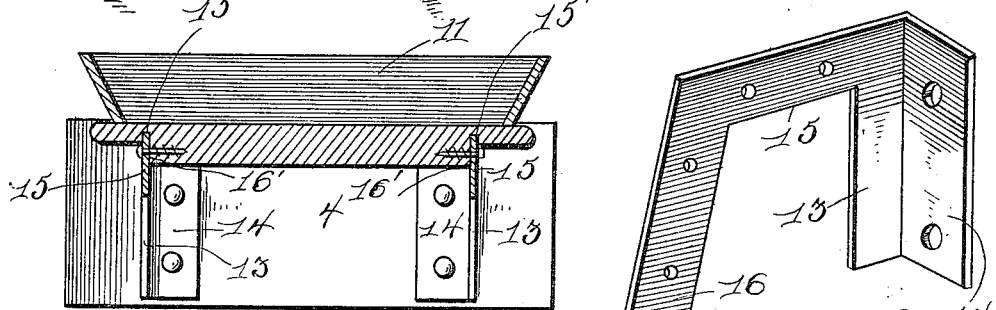
Inventor
Atkinson K. Ball.

A. K. BALL.
VEHICLE BODY.
APPLICATION FILED JULY 24, 1909.
994,051.
Patented May 30, 1911.
2 SHEETS—SHEET 2.
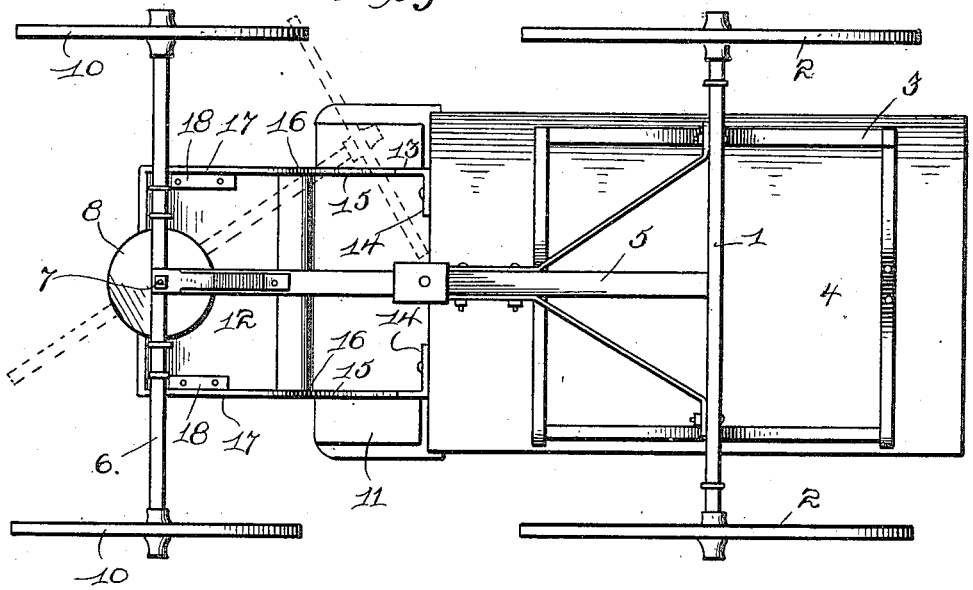
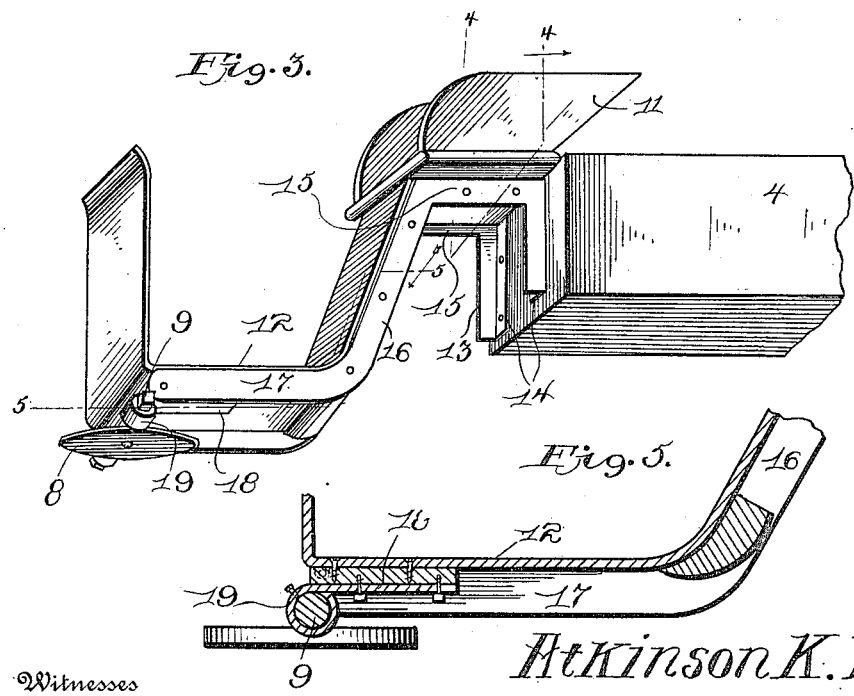
Inventor
Atkinson K. Ball.
Witnesses

UNITED STATES PATENT OFFICE.

ATKINSON K. BALL, OF COFFEYVILLE, KANSAS.

VEHICLE-BODY.

994,051.

Specification of Letters Patent.  Patented May 30, 1911.

Application filed July 24, 1909. Serial No. 509,303.

*To all whom it may concern:*

Be it known that I, ATKINSON K. BALL, citizen of the United States of America, residing at Coffeyville, in the county of Montgomery and State of Kansas, have invented a certain new and useful Improvement in Vehicle-Bodies, of which the following is a specification, reference being had therein to the accompanying drawing.

This invention relates to wagons especially adapted for delivery purposes, and the principal object of the same is to support the vehicle body so that access to its contents may be readily obtained by a person standing upon the ground.

Another object is to provide a novel means for supporting the seat and dashboard by said box and the front axle so that the driver can have access to the said box from his seat, and also to provide clearance space so that the front wheel can "cut under" the seat to permit short turning of the vehicle.

In carrying out the objects of the invention generally stated above, it will, of course, be understood that the essential features thereof are necessarily susceptible of changes in details and structural arrangements, but a preferred and practical embodiment thereof is shown in the accompanying drawings, wherein—

Figure 1 is a perspective view of the improved wagon. Fig. 2 is a bottom plan view. Fig. 3 is a fragmentary perspective view of the body of the wagon. Fig. 4 is a vertical sectional view taken on the line 4—4, Fig. 3. Fig. 5 is a similar sectional view taken on the line 5—5, Fig. 3. Fig. 6 is a detail perspective view of one of the supports for the dashboard and seat.

Referring to said drawings by numerals, 1 designates the rear axle, 2 the wheels therefor, 3 the platform spring gear supported by said axle, and 4 the vehicle box mounted upon said spring gear. A reach 5 projects from said axle 1 and has its forward end pivoted to the front axle 6 by means of the king bolt 7 which also passes through the fifth wheel 8 and bolster 9. The usual wheels 10 are carried by said axle 6, said wheels being smaller than the rear wheels 2. A pair of supporting members for the seat 11 and dashboard 12 project from the front end of said box, said members being of duplicate construction, each being provided with a vertically arranged portion 13 having a right angularly projecting flat flange 14 adapted for rigid engagement with said box, the upper ends of said vertical portion carrying a horizontally arranged seat supporting arm 15 adapted to have bearing in the kerfs or recesses 15' arranged adjacent the side edges of the seat, which is rabbeted to form shoulders 16', as clearly shown in Fig. 4, said arm having a downwardly and outwardly inclined leg 16 which has a rigid engagement with the similarly inclined rear leg of the dashboard, said leg terminating in a horizontally arranged supporting arm 17 for supporting the floor or bottom of said dashboard. As shown in the drawings, the supporting members are arranged so that ample clearance space is provided below the seat and between the dashboard and box to permit the front wheels to cut under so that a short turn of the vehicle may be obtained.

The underside of the bottom of the dashboard 12 is provided with a pair of longitudinally arranged plates 18 the outer ends of which are rolled to form eyes 19 which surround the bolster 9 so as to hold said dashboard in engagement therewith.

It will be seen from the foregoing that the improved wagon provides a "low hung" body by means of which the contents of the box may be easily reached from the ground, and the described manner of mounting said box on the platform spring gear and the connection between the dashboard and the front bolster assures of the body of the vehicle being well balanced. Another prominent feature of the invention is the type of supporting members for connecting the seat and dashboard to the box. It will be seen that said supporting members in addition to providing the necessary clearance for the front wheel also assure of a rigid connection of said seat and dashboard with said box.

What I claim as my invention is:—

The combination with a wagon having a foot board, of a seat having a cut-out portion at each end in its under surface to form shoulders and provided with transverse slots at the upper ends of said shoulders, strips of metal shaped to conform to the contour of the seat and foot board, the upper portions of said strips being secured to said shoulders and entering said slots, and said strips having downwardly extending angled flanges secured to the body of said wagon and fitting between said seat and the body of said wagon.

In testimony whereof he hereunto affixes his signature in presence of two witnesses.

ATKINSON K. BALL.

Witnesses:
P. B. FLORIA,
HARRY C. JORDAN.

Copies of this patent may be obtained for five cents each, by addressing the "Commissioner of Patents, Washington, D. C."